United States Patent
Shiomi

(10) Patent No.: US 8,934,153 B2
(45) Date of Patent: Jan. 13, 2015

(54) IMAGE READER

(71) Applicant: Hiroshi Shiomi, Aichi (JP)

(72) Inventor: Hiroshi Shiomi, Aichi (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/141,010

(22) Filed: Dec. 26, 2013

(65) Prior Publication Data

US 2014/0198359 A1    Jul. 17, 2014

(30) Foreign Application Priority Data

Jan. 17, 2013  (JP) ................................ 2013-005837

(51) Int. Cl.
*H04N 1/04*    (2006.01)
*H04N 1/40*    (2006.01)
*H04N 1/047*   (2006.01)
*H04N 1/10*    (2006.01)

(52) U.S. Cl.
CPC ............. *H04N 1/047* (2013.01); *H04N 1/1061* (2013.01)
USPC ........... 358/497; 358/484; 358/449; 358/474; 358/471; 358/498

(58) Field of Classification Search
USPC .................. 358/497, 484, 449, 474, 471, 498
See application file for complete search history.

(56) References Cited

U.S. PATENT DOCUMENTS

| | | | | |
|---|---|---|---|---|
| 5,999,277 A * | 12/1999 | Tsai | ................................ | 358/498 |
| 6,771,399 B1 * | 8/2004 | Batten | ........................... | 358/497 |
| 7,525,695 B2 * | 4/2009 | Akaike | ......................... | 358/471 |
| 7,768,679 B2 * | 8/2010 | Yamaguchi | .................... | 358/497 |
| 8,081,356 B2 * | 12/2011 | Yamauchi | ..................... | 358/497 |
| 2004/0263918 A1 * | 12/2004 | Akaike | ......................... | 358/474 |
| 2007/0146817 A1 * | 6/2007 | Osakabe | ........................ | 358/474 |
| 2009/0190190 A1 * | 7/2009 | Yamauchi | ..................... | 358/474 |
| 2014/0153068 A1 * | 6/2014 | Xu et al. | ........................ | 358/497 |
| 2014/0198356 A1 * | 7/2014 | Yamasaki | ..................... | 358/484 |

FOREIGN PATENT DOCUMENTS

| | | |
|---|---|---|
| JP | 2-89467 A | 3/1990 |
| JP | 10-308857 A | 11/1998 |
| JP | 2008-209805 A | 9/2008 |
| JP | 2009-205134 A | 9/2009 |
| JP | 2009-253327 A | 10/2009 |

* cited by examiner

*Primary Examiner* — Charlotte M Baker
*Assistant Examiner* — Rury Grisham
(74) *Attorney, Agent, or Firm* — Merchant & Gould PC

(57) ABSTRACT

An image reader is provided, which includes a housing including a base, and a reading unit including a holder, the base including a bottom wall, a first guide disposed at a first-side portion of the bottom wall in a first direction, and a second guide disposed at a second-side portion of the bottom wall in the first direction, and the reading unit further including a third guide disposed at a first-side portion of the holder in the first direction, the third guide configured to come into sliding contact with the first guide when the reading unit moves, and a fourth guide disposed at a second-side portion of the holder in the first direction, the fourth guide configured to come into sliding contact with the second guide when the reading unit moves.

9 Claims, 8 Drawing Sheets

IMAGE READER

CROSS-REFERENCE TO RELATED APPLICATION

This application claims priority under 35 U.S.C. §119 from Japanese Patent Application No. 2013-005837 filed on Jan. 17, 2013. The entire subject matter of the application is incorporated herein by reference.

BACKGROUND

1. Technical Field

The following description relates to one or more techniques for an image reader configured to read an image formed on a document sheet.

2. Related Art

An image reader has been known that includes a housing and an image reading unit. The housing includes a document table and a resin base configured to support the document table from beneath. The image reading unit includes an image sensor configured to extend in a first direction and read an image of a document sheet placed on the document table, a holder configured to hold the image sensor, and an urging unit provided at the holder and configured to urge the image sensor toward the document table. The image reading unit is movable along a second direction perpendicular to the first direction.

The resin base has a bottom wall disposed below the document table. The bottom wall includes a guiderail disposed at a center thereof in the first direction. The guiderail extends in the second direction, and protrudes from the bottom wall toward the document table in a third direction perpendicular to the first and second directions.

The image reading unit includes a reader-side guide portion disposed at a center of the holder in the first direction. The reader-side guide portion is recessed toward the document table from the bottom wall in the third direction, and contacts the guiderail. When the image reading unit moves, the reader-side guide portion and the resin guiderail are brought into sliding contact with each other.

Thus, according to the known image reader employing the resin guiderail instead of a metal guiderail that has been used so far, it is possible to achieve a low cost for manufacturing the image reader.

SUMMARY

Nonetheless, in the known image reader, a reaction force, generated when the urging unit urges the image sensor toward the document table, is applied to the resin guiderail and the bottom wall via the holder at which the urging unit is provided and the reader-side guide portion included in the holder. Further, the resin guiderail is disposed at the center of the bottom wall in the first direction, and has a lower stiffness than the stiffness of the metal guiderail. Therefore, there might be a case where the resin guiderail is creep-deformed in such a manner that the center of the bottom wall in the first direction is farther away from the document table in the third direction, in response to the reaction force being applied to the bottom wall for a long period of time. By such creep deformation of the bottom wall, the holder, of which the reader-side guide portion comes into sliding contact with the guiderail, is rendered farther away from the document table toward the bottom wall in the third direction. In this situation, it is difficult for the urging unit to urge the image sensor toward the document table in a favorable manner. It might result in a lowered accuracy for positioning the image sensor relative to the document table in the third direction and a lowered level of quality in image reading by the image reader.

Aspects of the present invention are advantageous to provide one or more improved techniques, for an image reader, which make it possible to achieve a low cost for manufacturing the image reader and reduce deterioration of the quality in image reading by the image reader.

According to aspects of the present invention, an image reader is provided, which includes a housing including a document table, and a base configured to support the document table from beneath, and a reading unit including an image sensor extending in a first direction and configured to read an image of a document sheet on the document table, a holder configured to hold the image sensor, and an urging unit disposed at the holder and configured to urge the image sensor toward the document table, the reading unit configured to move along a second direction perpendicular to the first direction, the base including a bottom wall disposed below the document table, a first guide disposed at a first-side portion of the bottom wall in the first direction, the first guide extending in the second direction and formed in one shape of a shape protruding from the bottom wall toward the document table and a shape recessed from the document table toward the bottom wall in a third direction perpendicular to the first direction and the second direction, and a second guide disposed at a second-side portion of the bottom wall in the first direction, the second guide extending in the second direction and formed in one shape of a shape protruding from the bottom wall toward the document table and a shape recessed from the document table toward the bottom wall in the third direction, the reading unit further including a third guide disposed at a first-side portion of the holder in the first direction, the third guide formed in one shape of a shape protruding from the document table toward the bottom wall and a shape recessed from the bottom wall toward the document table in the third direction, the third guide configured to come into sliding contact with the first guide when the reading unit moves, and a fourth guide disposed at a second-side portion of the holder in the first direction, the fourth guide formed in one shape of a shape protruding from the document table toward the bottom wall and a shape recessed from the bottom wall toward the document table in the third direction, the fourth guide configured to come into sliding contact with the second guide when the reading unit moves.

According to aspects of the present invention, further provided is an image reader that includes a housing including a document table, and a base configured to support the document table from beneath, and a reading unit including an image sensor extending in a first direction and configured to read an image of a document sheet on the document table, a holder configured to hold the image sensor, and an urging unit disposed at the holder and configured to urge the image sensor toward the document table, the reading unit configured to move along a second direction perpendicular to the first direction, the base including a bottom wall disposed below the document table, a first guide disposed at a first-side portion of the bottom wall in the first direction, the first guide extending in the second direction, and a second guide disposed at a second-side portion of the bottom wall in the first direction, the second guide extending in the second direction, the reading unit including a third guide disposed at a first-side portion of the holder in the first direction, and a fourth guide disposed at a second-side portion of the holder in the first direction, the reading unit being further configured to move along the second direction while being positioned relative to the housing with the third guide being guided by the first guide and the fourth guide being guided by the second guide in response to movement of the reading unit along the second direction.

According to aspects of the present invention, further provided is an image reader that includes a housing including a document table, and a base including a bottom wall disposed below the document table, and a side wall extending upward from the bottom wall and configured to support a fringe of the document table from beneath, and a reading unit including an image sensor extending in a first direction and configured to read an image of a document sheet on the document table, and a holder configured to hold the image sensor, the reading unit configured to move along a second direction perpendicular to the first direction, the base further including a first guide disposed adjacent to the side wall at a first-side portion of the bottom wall in the first direction, the first guide extending in the second direction, and a second guide disposed adjacent to the side wall at a second-side portion of the bottom wall in the first direction, the second guide extending in the second direction, the reading unit further including a third guide disposed at a first-side portion of the holder in the first direction, the third guide configured to be guided by the first guide of the base while sliding in contact with the first guide during movement of the reading unit along the second direction, and a fourth guide disposed at a second-side portion of the holder in the first direction, the fourth guide configured to be guided by the second guide of the base while sliding in contact with the second guide during the movement of the reading unit along the second direction.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the present invention will be described with reference to the accompanying drawings.

(Embodiment)

Figure 1:
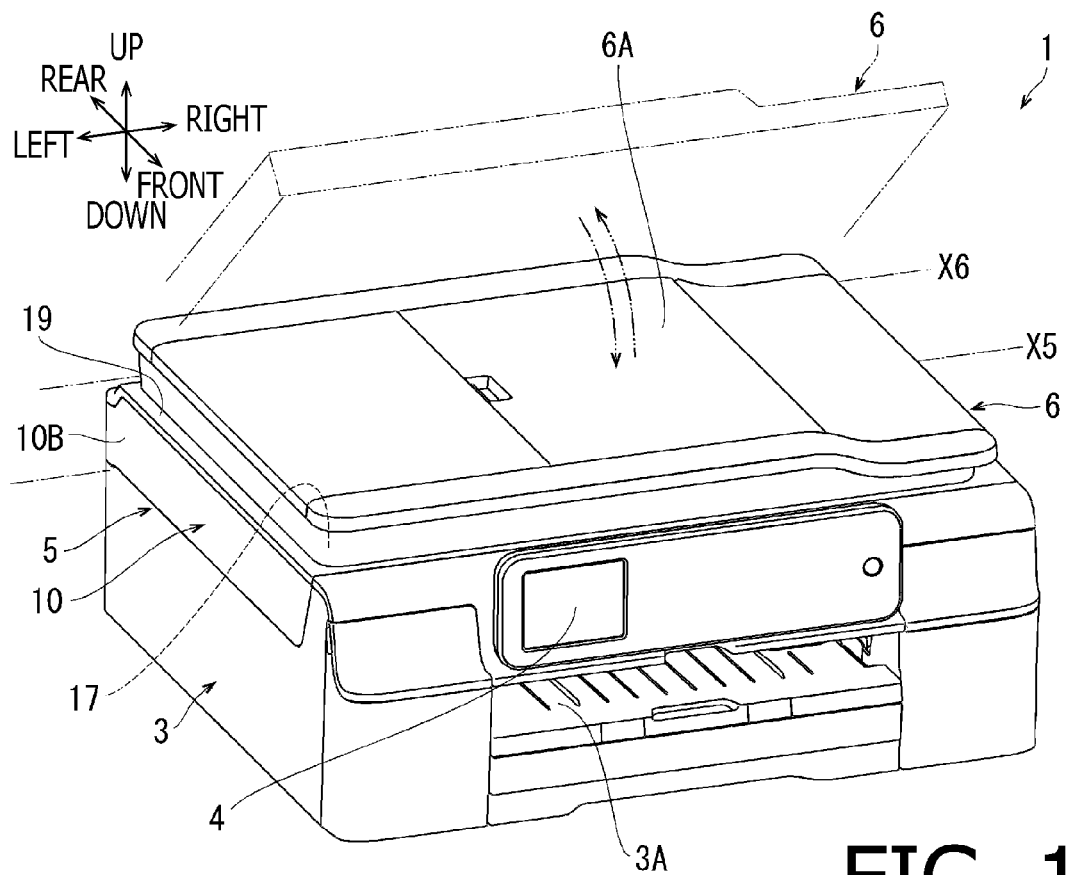
FIG. 1 is a perspective view schematically showing an image reader in an embodiment according to one or more aspects of the present invention.

FIG. 1 shows an image reader 1 of an embodiment according to aspects of the present invention. In the embodiment, a front side, a rear side, a left side, a right side, an upside, and the downside of the image reader 1 will be defined as shown in FIG. 1 and the other accompanying drawings. Hereinafter, referring to FIG. 1 and relevant drawings, a general configuration of the image reader 1 will be described. Thereafter, specific configurations of a housing 5 and a reading unit 9 will be described in detail.

<General Configuration>

Figure 2:
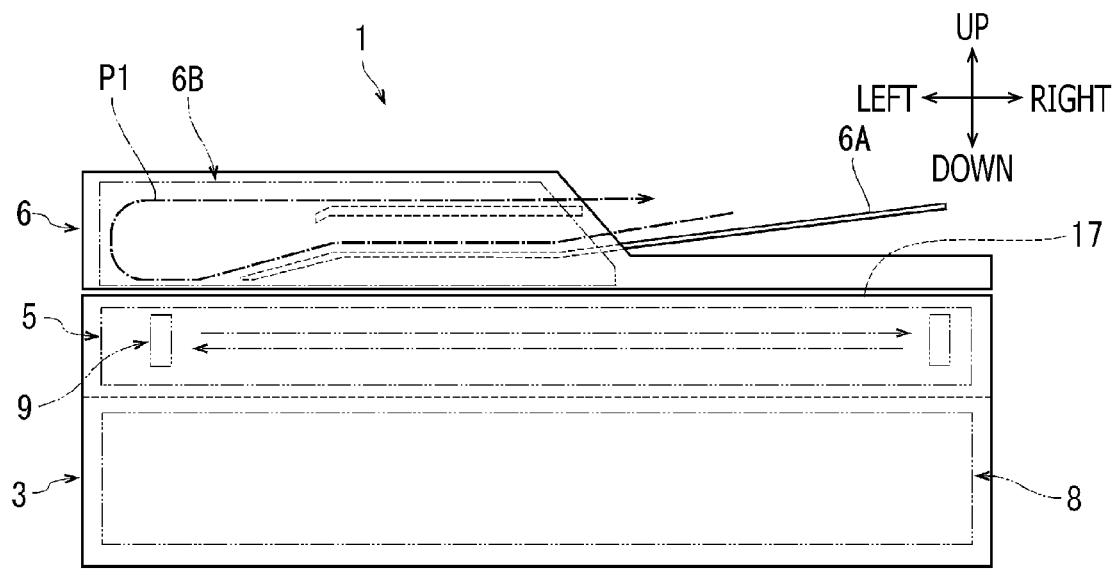
FIG. 2 is a front view schematically showing the image reader in the embodiment according to one or more aspects of the present invention.
Figure 3:
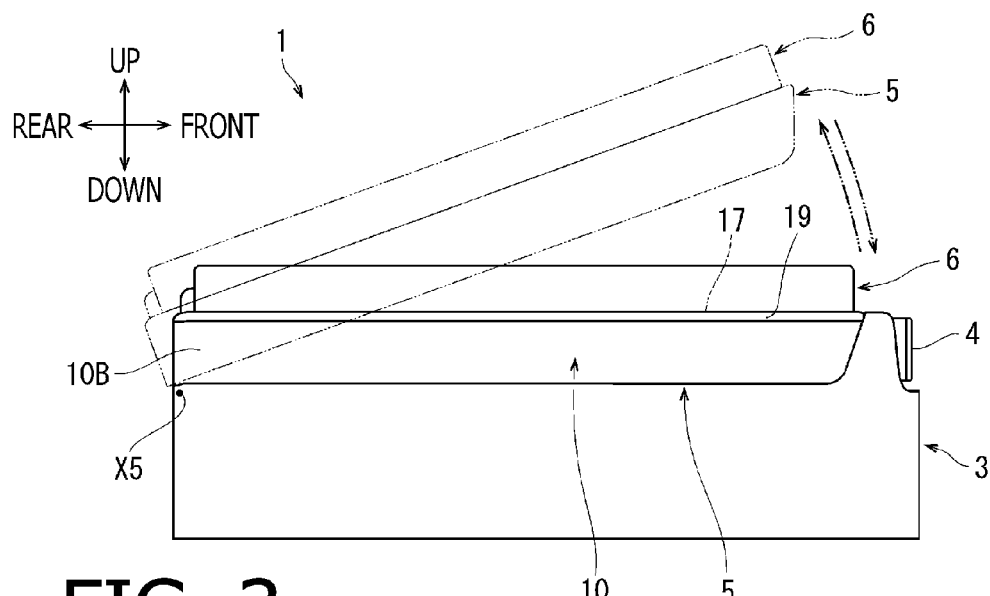
FIG. 3 is a side view schematically showing the image reader in the embodiment according to one or more aspects of the present invention.

As shown in FIGS. 1 to 3, the image reader 1 includes a housing 5, a case 3 disposed below the housing 5, and an opening-closing unit 6 disposed above the housing 5.

Figure 4:
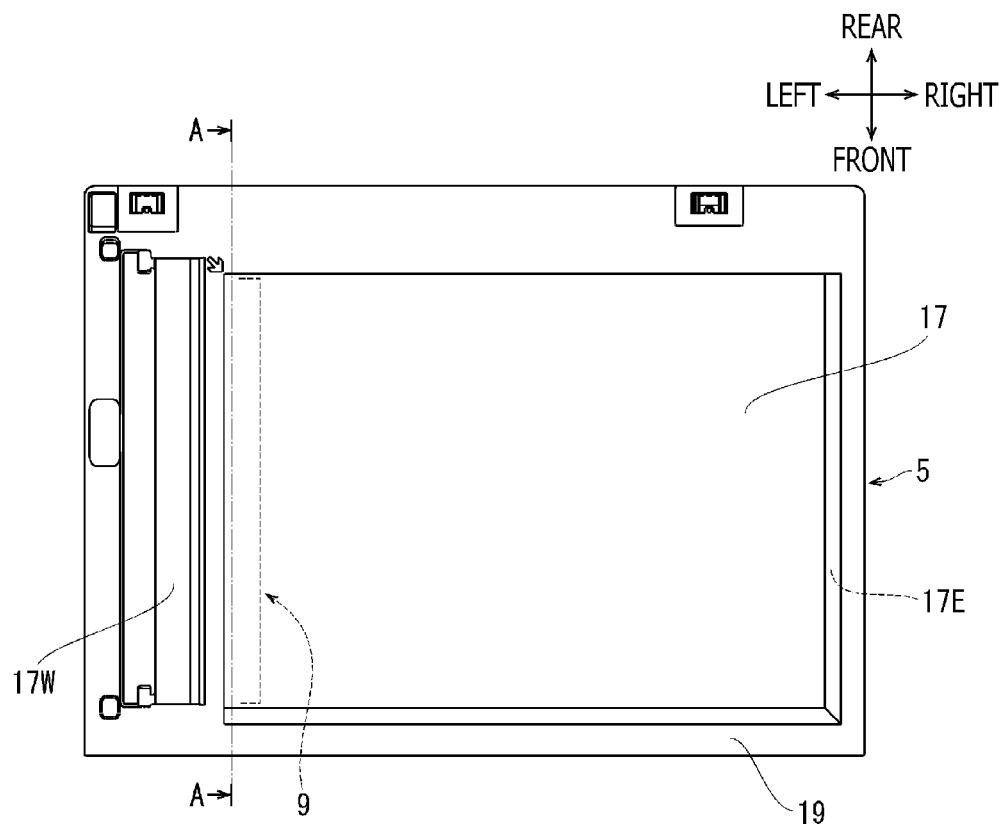
FIG. 4 is a top view schematically showing a housing of the image reader in the embodiment according to one or more aspects of the present invention.
Figure 5:
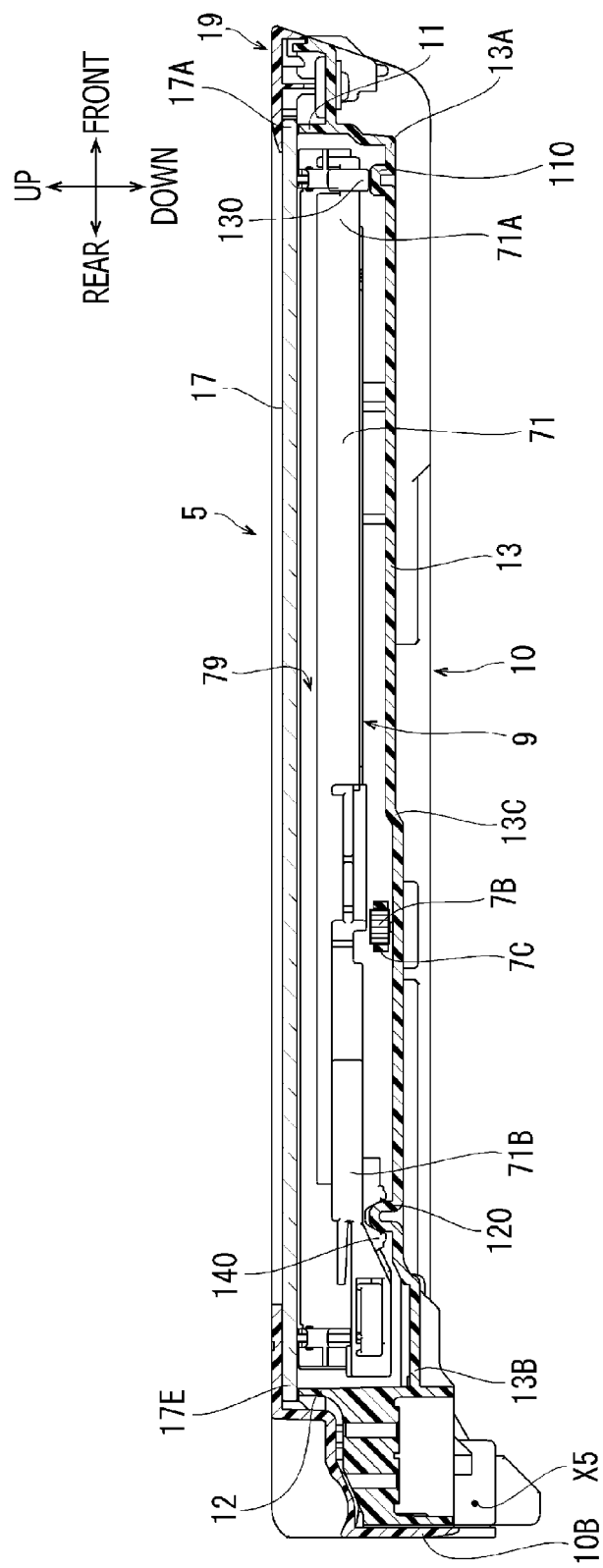
FIG. 5 is a cross-sectional view of the housing taken along an A-A cutting plane shown in FIG. 4 in the embodiment according to one or more aspects of the present invention.

As shown in FIGS. 1 to 3, the housing 5 is formed substantially in a box shape flattened in a vertical direction. As shown in FIGS. 4 and 5, the housing 5 includes a base 10, a document table 17, and a top cover 19. The base 10 is a resin member formed substantially in an upward-open box shape. The document table 17 is a rectangular transparent glass plate. The top cover 19 is a frame-shaped resin member. When the base 10 supports a fringe 17E of the document table 17 from beneath, and the top cover 19 comes into contact with the fringe 17E from above, the document table 17 is pinched between the base 10 and the top cover 19. Thereby, the document table 17 is fixed, in an exposed state, to an upper face of the housing. The document table 17 is configured to support a document sheet placed thereon to be read in a static state. The document sheet may include sheet-shaped objects such as a paper and a transparency (an OHP sheet), and a page of a book.

Figure 6:
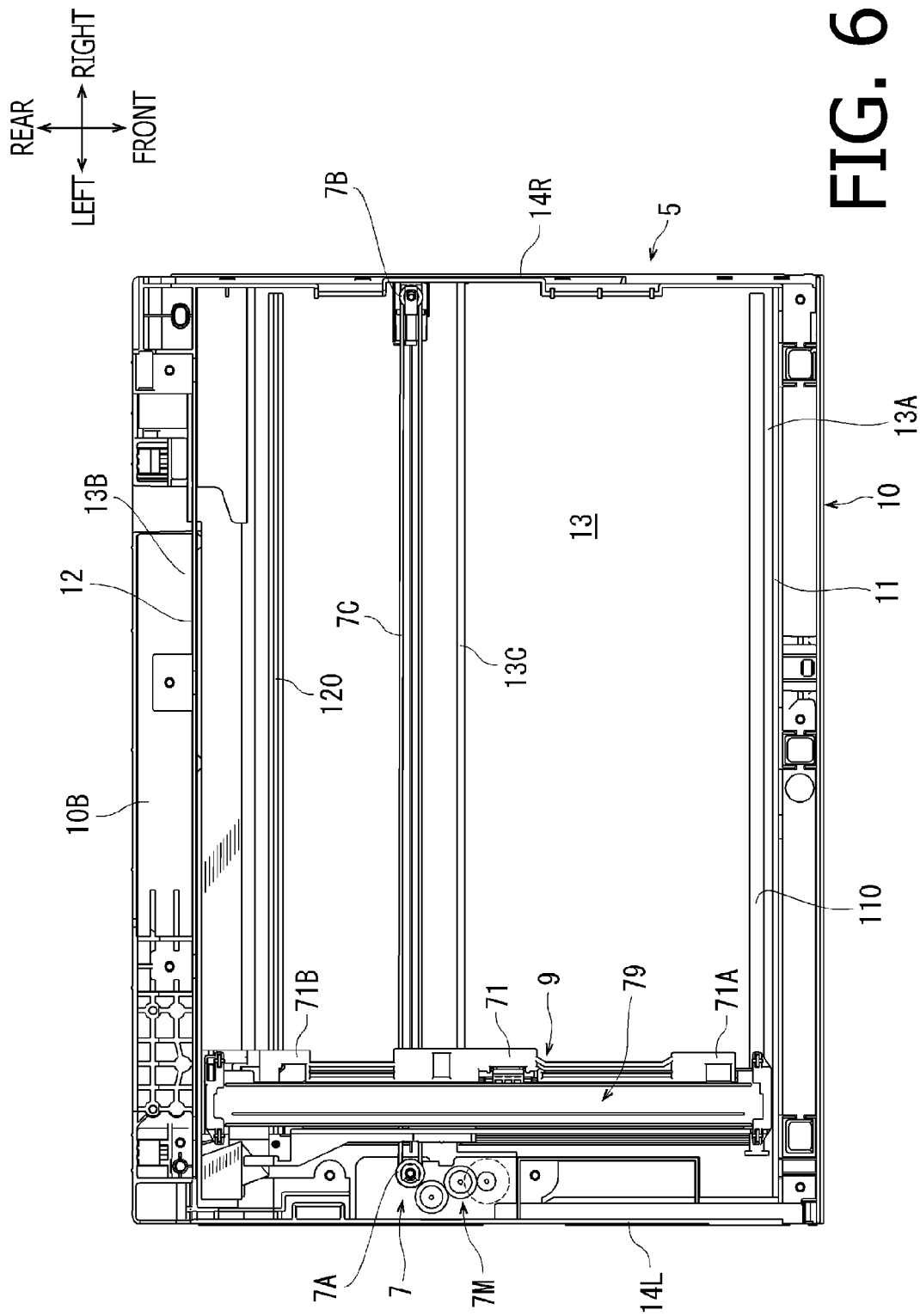
FIG. 6 is a top view schematically showing a base and a reading unit of the image reader in the embodiment according to one or more aspects of the present invention.
Figure 7:
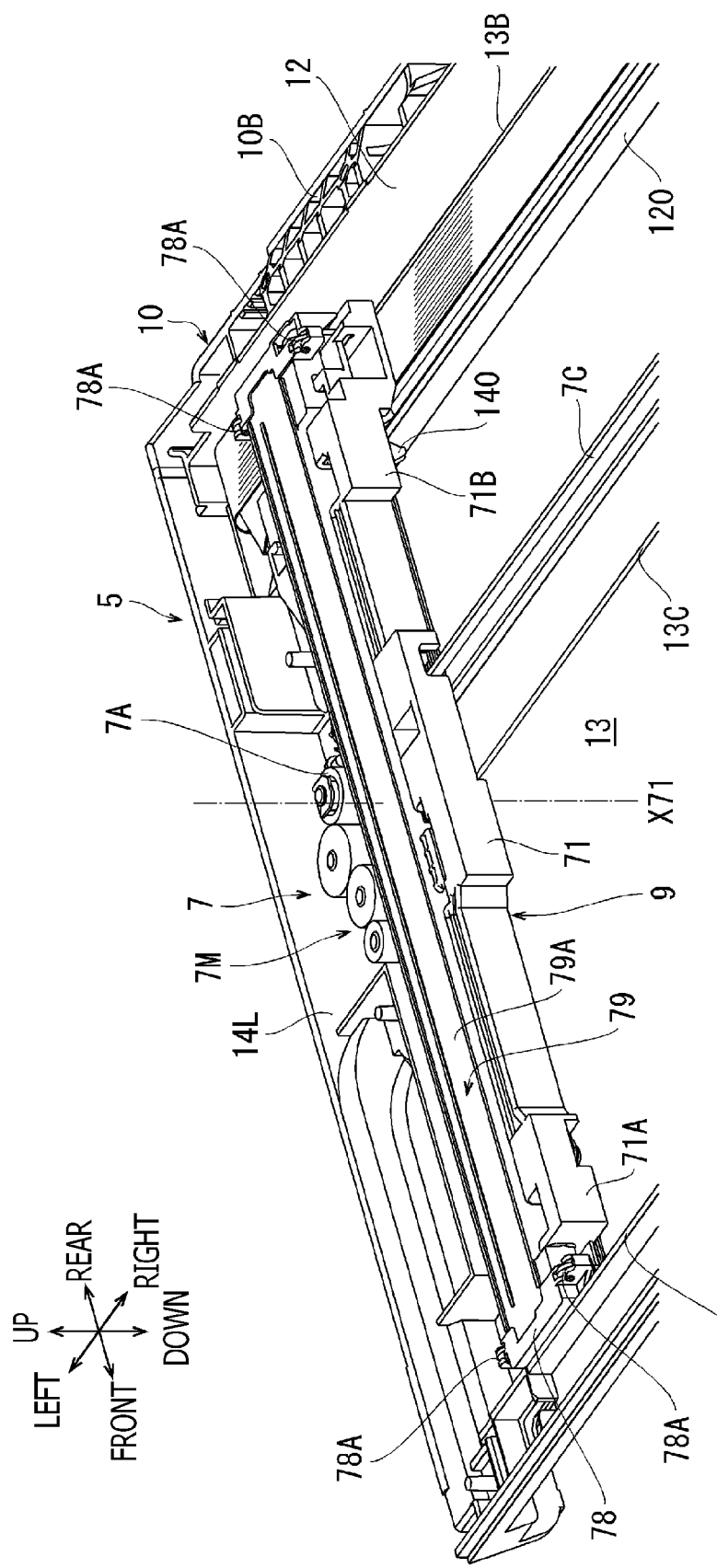
FIG. 7 is a perspective view partially showing the base and the reading unit of the image reader in the embodiment according to one or more aspects of the present invention.

As shown in FIGS. 2 and 4 to 7, the housing 5 contains a reading unit 9 disposed therein. As shown in FIGS. 5 to 7, the reading unit 9 includes an image sensor 79. As the image sensor 79, known image reading sensors may be exemplified such as a contact image sensor (CIS) and a charge coupled device (CCD). The image sensor 79 extends in a front-to-rear direction. A length of the image sensor 79 in the front-to-rear direction is larger than a length in the front-to-rear direction of a maximum-size document sheet supportable on the document table 17.

As shown in FIG. 2, the reading unit 9 is configured to be reciprocated along a left-to-right direction inside the housing 5 by a scanning mechanism 7 shown in FIGS. 6 and 7.

As shown in FIGS. 1 to 3, the housing 3 is formed substantially in a box shape. A front side of the case 3 protrudes upward so as to cover a front end of the housing 5. As shown in FIG. 1, an operation panel 4 and a catch tray 3A are disposed on the front side of the case 3. As shown in FIG. 2, the case 3 contains an image forming unit 8 disposed therein. The image forming unit 8 is configured to form an image on a sheet in an image forming method such as a laser printing method and an inkjet printing method, and eject onto the catch tray 3A the sheet with the image formed thereon.

As shown in FIGS. 1, 3, and 5, the housing 5 is supported by the case 3 so as to be swingable around an axis X5 extending in the left-to-right direction at a rear end 10B of the base 10. When the housing 5 is swung around the axis X5 such that the front end thereof moves toward an upper rear side from a closed state as shown by a solid line in FIG. 3 to an open state as shown by a long dashed double-short dashed line in FIG. 3, an upper side of the catch tray 3A is opened. Thereby, it is possible to do maintenance on the image forming unit 8 or remove a sheet jammed in the image forming unit 8.

As shown in FIG. 1, the opening-closing unit 6 is supported by the housing 5 (more specifically, by a hinge (not shown) disposed at an upper end of a rear face of the housing 5) so as to be swingable around an axis X6 extending in the left-to-right direction. As shown by a solid line in FIG. 1, the opening-closing unit 6, in a closed state, covers the document table 17 from above. Meanwhile, as shown by a long dashed double-short dashed line in FIG. 1, when the opening-closing unit 6 is swung around the axis X6 such that a front end thereof moves toward an upper rear side, an upper side of the document table 17 is opened. Thereby, a user is allowed to place on the document table 17 an intended document sheet to be read.

As shown in FIGS. 1 and 2, a feed tray 6A is provided at an upper portion of the opening-closing unit 6 so as to be openable and closable. As shown in FIG. 2, an automatic document feeder (ADF) 6B is disposed in the opening-closing unit 6. The ADF 6B is configured to separate sheets placed on the feed tray 6A in an open state on a sheet-by-sheet basis, and sequentially feed the sheets on a sheet-by-sheet basis along a conveyance path P1.

In the image reader 1, as shown in FIG. 2, the reading unit 9 is moved from a left end to a right end inside the housing 5 to read a document sheet placed on the document table 17 is read. Thereby, the image sensor 79 moves from the left end to the right end under the sheet on the document table 17, and reads out an image formed on the document sheet. After completion of the reading operation by the image sensor 79, the reading unit 9 returns to the original position.

Further, in the image reader 1, as shown in FIG. 2, the reading unit 9 moves to a statically-reading position at a left end inside the housing 5, so as to read document sheets placed on the feed tray 6A. When the reading unit 9 is in the statically-reading position, the image sensor 79 is in a position under a reading window 17W shown in FIG. 4. Then, when the ADF 6B sequentially feeds the document sheets placed on the feed tray 6A along the conveyance path P1, the sequentially-fed document sheets pass over the reading window 17W. Therefore, the image sensor 79 is allowed to read images of the sequentially-fed document sheets through the reading window 17W.

Thus, the image reader 1 is allowed to read an image of a document sheet placed on the document table 17, and read images of document sheets placed on the feed tray 6A.

<Specific Configurations of Housing and Reading Unit>

As shown in FIGS. 5 to 9, the base 10, included in the housing 5, is a part integrally molded by injection molding of thermoplastic resin. The base 10 includes a bottom wall 13, a first side wall 11, a second side wall 12, a left wall 14L, and a right wall 14R.

The bottom wall 13 is located lower than the document table 17. The bottom wall 13 is formed in a flat plate shape extending horizontally. It is noted that "a flat plate shape" means a substantially flat plate shape, which may contain concavity-convexity portions, curved portions, and bent portions.

Figure 8:
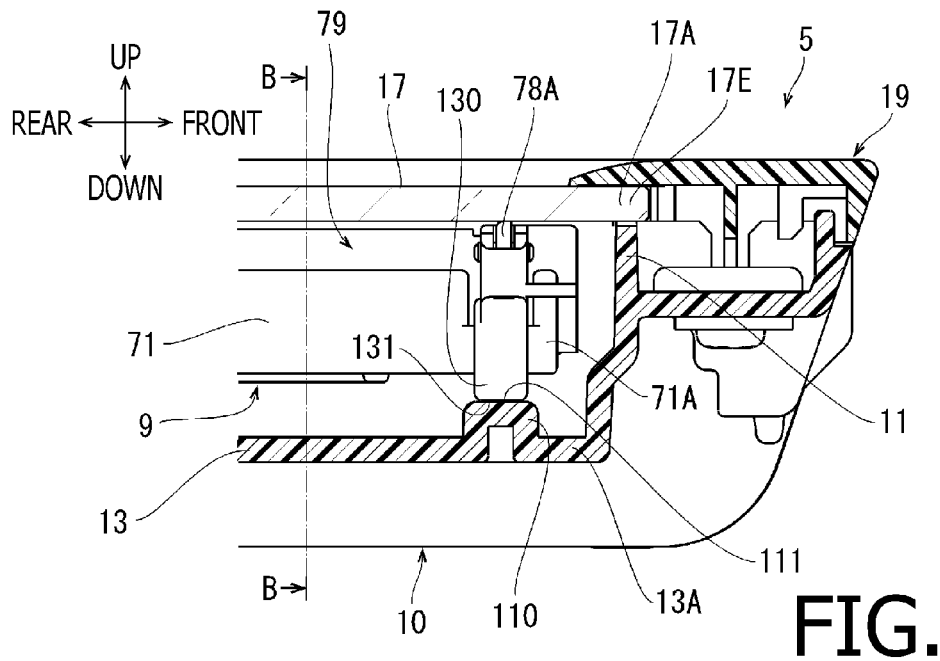
FIG. 8 is an enlarged cross-sectional view partially showing the housing of the image reader in the embodiment according to one or more aspects of the present invention.

As shown in FIGS. 5 to 8, the first side wall 11 extends upward from a front end 13A of the bottom wall 13. Further, the first side wall 11 extends in a flat plate shape along the left-to-right direction. As shown in FIG. 8, an upper end of the first side wall 11 contacts a front end 17A of the document table 17 from beneath, and pinches the front end 17A with the top cover 19 that contacts the front end 17A from above. Thus, the first side wall 11 supports the front end 17A of the document table 17 from beneath.

Figure 9:
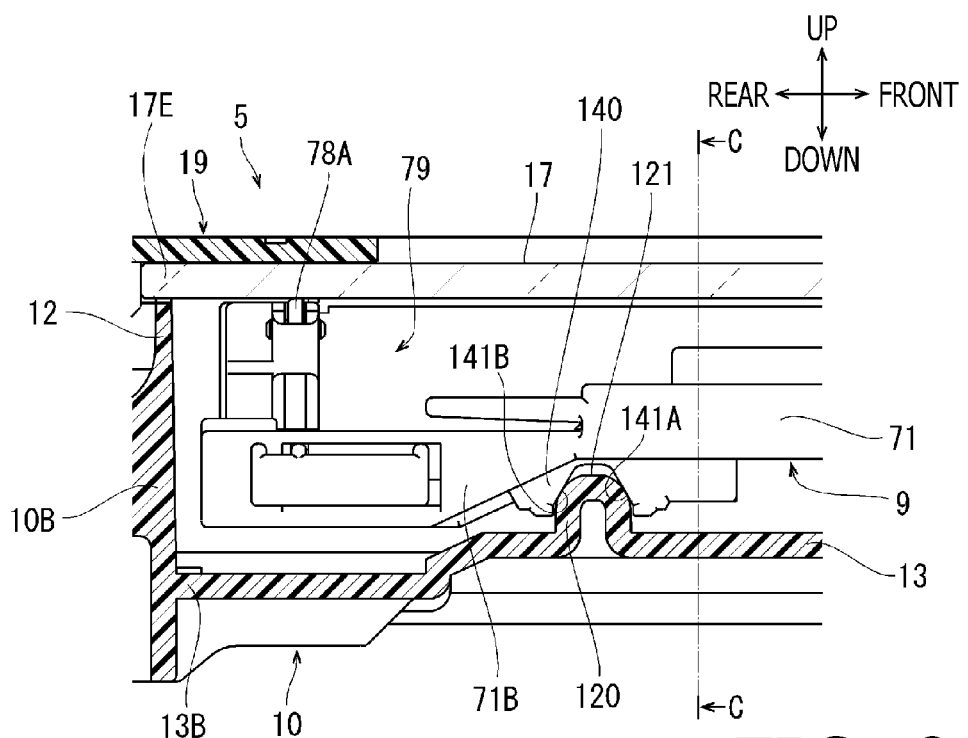
FIG. 9 is an enlarged cross-sectional view partially showing the housing of the image reader in the embodiment according to one or more aspects of the present invention.

As shown in FIGS. 5 to 7, and 9, the second side wall 12 extends upward from a rear end 13B of the bottom wall 13. Further, the second side wall 12 extends in a flat plate shape along the left-to-right direction. As shown in FIG. 9, an upper end of the second side wall 12 contacts a rear end 17B of the document table 17 from beneath, and pinches the rear end 17B with the top cover 19 that contacts the rear end 17B from above. Thus, the second side wall 12 supports the rear end 17B of the document table 17 from beneath.

As shown in FIGS. 6 and 7, the left wall 14L extends upward from a left end of the bottom wall 13. Further, the left wall 14L extends in a flat plate shape along the front-to-rear direction. As shown in FIG. 6, the right wall 14R extends upward from a right end of the bottom wall 13. Further, the right wall 14R extends in a flat plate shape along the front-to-rear direction. Although it is not shown in any drawing, an upper end of the left wall 14L contacts a left end of the document table 17 from beneath, and pinches the left end with the top cover 19 that contacts the left end from above. Thus, the left wall 14L supports the left end of the document table 17 from beneath. Moreover, although it is not shown in any drawing, an upper end of the right wall 14R contacts a right end of the document table 17 from beneath, and pinches the right end with the top cover 19 that contacts the right end from above. Thus, the right wall 14R supports the right end of the document table 17 from beneath.

As shown in FIG. 5, in a middle section of the bottom wall 13 in the front-to-rear direction, a bent portion 13 is formed. The bent portion 13C, after shortly extending upward from a portion extending in the front-to-rear direction, is bent and again oriented in the front-to-rear direction. Thereby, in the bottom wall 13, a front portion thereof relative to the bent portion 13C is closer to the document table 17 than a rear portion thereof. In other words, a portion of the base 10 on a side close to the first side wall 11 is thinner in the vertical direction than a portion of the base 10 on a side close to the second side wall 12.

As shown in FIGS. 6 and 7, the scanning mechanism 7 is disposed in the housing 5. The scanning mechanism 7 includes a driving source 7M, a driving pulley 7A, a driven pulley 7B, and a timing belt 7C.

The driving source 7M includes an electric motor, and a group of gears configured to engage with the electric motor. The driving source 7M is disposed adjacent to a middle section of the left wall 14L in the front-to-rear direction, on a right side of the left wall 14L. The driving source 7M is controlled by a controller (not shown) to rotate.

The driving pulley 7A is disposed close to the driving source 7M. The driving pulley 7A is supported by the bottom wall 13 so as to be rotatable around an axis extending in the vertical direction. The driving pulley 7A is formed integrally with a gear configured to the group of gears of the driving source 7M.

When the electric motor of the driving source 7M is controlled by the controller (not shown) to rotate, the driving pulley 7A is driven to rotate. When the controller switches a rotational direction of the electric motor, the driving pulley 7A rotates forward or reversely.

As shown in FIG. 6, the driven pulley 7B is disposed adjacent to a middle section of the right wall 14R in the front-to-rear direction, on a left side of the right wall 14R. The driven pulley 7B is supported by the bottom wall 13 so as to be rotatable around an axis extending in the vertical direction.

The timing belt 7C is an endless belt wound around the driving pulley 7A and the driven pulley 7B. Although it is not shown in any drawing, one of two linear sections extending parallel to each other from the driving pulley 7A to the driven pulley 7B is connected with a holder 71 of the reading unit 9. Thereby, a movement of the timing belt 7C in response to the forward rotation or the reverse rotation of the driving pulley 7A is transmitted to the holder 71 of the reading unit 9, and therefore, the reading unit 9 is allowed to reciprocate along the left-to-right direction.

As shown in FIGS. 5 to 12, the base 10 includes a first convex portion 110 and a second convex portion 120.

As shown in FIGS. 5, 6, 8, 10, and 12, the first convex portion 110 is disposed at the front end 13A of the bottom wall 13. The first convex portion 110 is located adjacent to the first side wall 11, behind the first side wall 11. The first convex portion 110 extends along the first side wall 11 in the left-to-right direction. The first convex portion 110 protrudes up toward the document table 17 from the bottom wall 13 in the vertical direction.

Figure 12:
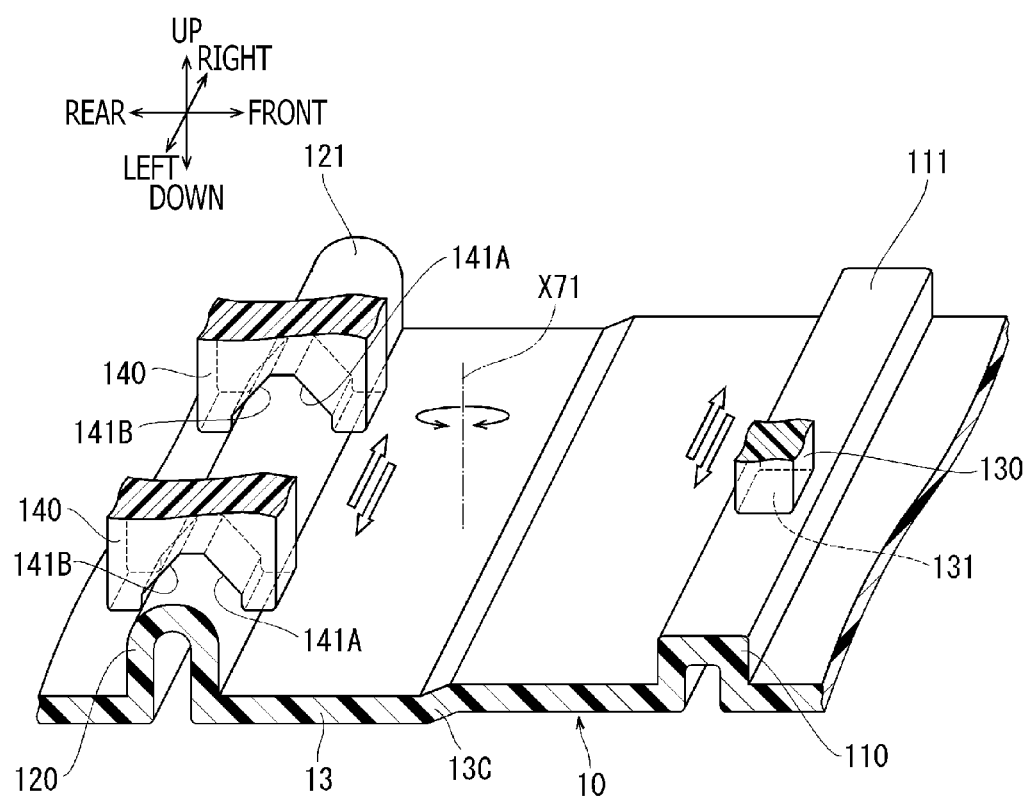
FIG. 12 is a perspective view schematically showing relative relationships among a first convex portion, a second convex portion, a third convex portion, and fourth concave portions in the embodiment according to one or more aspects of the present invention.

As shown in FIGS. 8 and 12, the first convex portion 110 bulges upward in a rectangular shape in a cross-sectional view taken along a plane perpendicular to the left-to-right direction. The first convex portion 110 has a distal end surface 111 that is a flat surface perpendicular to the vertical direction.

As shown in FIGS. 5 to 7, 9, 11, and 12, the second convex portion 120 is disposed at the rear end 13B of the bottom wall 13. The second convex portion 120 is located adjacent to the second side wall 12, on a front side of the second side wall 12. The second convex portion 120 extends along the second side wall 12 in the left-to-right direction. The second convex portion 120 protrudes up toward the document table 17 from the bottom wall 13 in the vertical direction.

As shown in FIGS. 9 and 12, the second convex portion 120 includes an arc section 121 that bulges upward in an arc shape in a cross-sectional view taken along a plane perpendicular to the left-to-right direction.

As shown in FIGS. 7 to 11, the reading unit 9 includes the image sensor 79, the holder 71, a third convex portion 130, fourth concave portions 140, a first urging member 77A, and a second urging member 77B.

Figure 10:
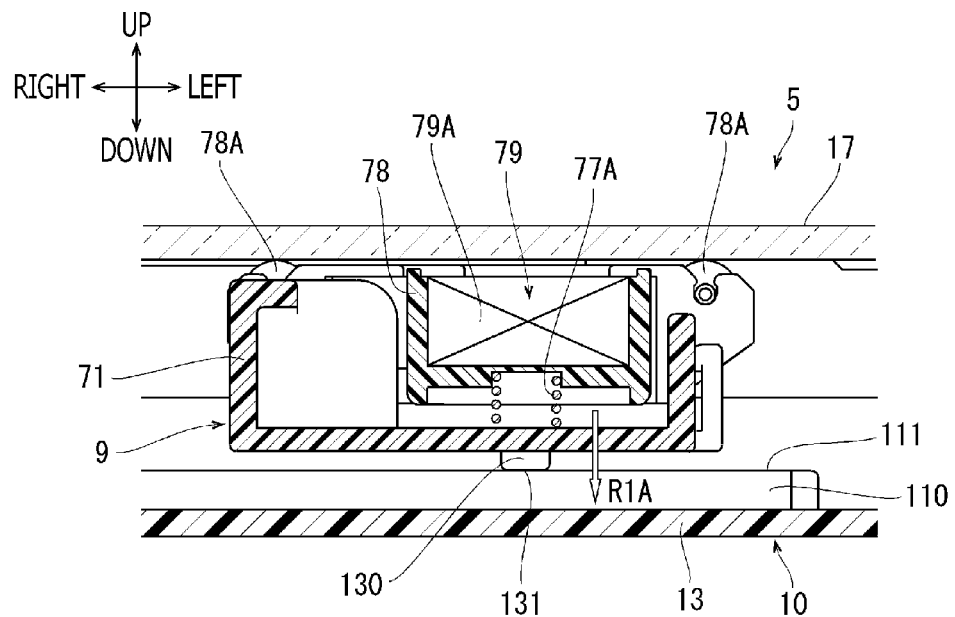
FIG. 10 is a cross-sectional view partially showing the housing taken along a B-B cutting plane shown in FIG. 8 in the embodiment according to one or more aspects of the present invention.
Figure 11:
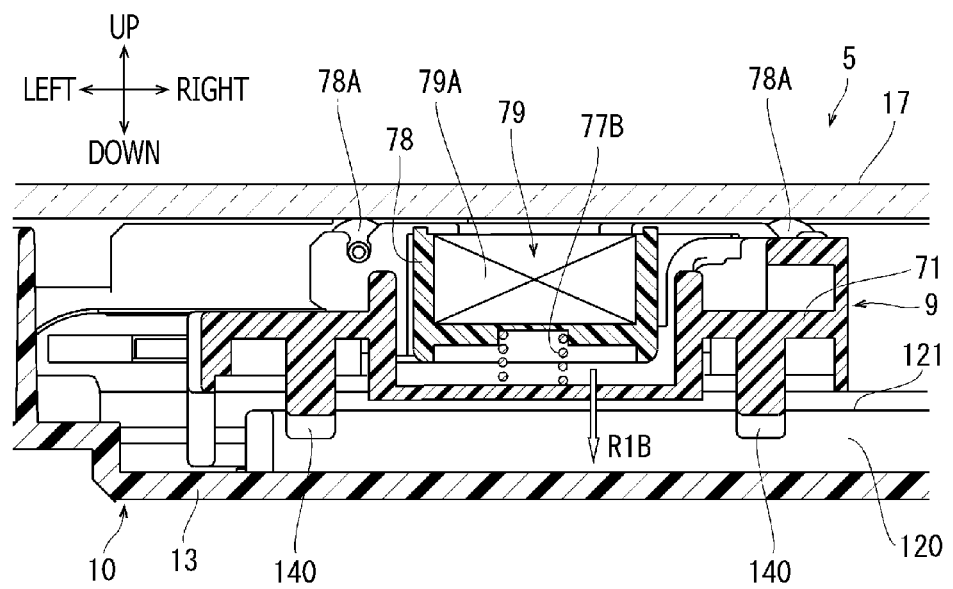
FIG. 11 is a cross-sectional view partially showing the housing taken along a C-C cutting plane shown in FIG. 9 in the embodiment according to one or more aspects of the present invention.

As shown in FIGS. 7, 10, and 11, the image sensor 79 includes a sensor device 79A, and a sensor case 78 incorporating the sensor device 79A. The sensor case 78 has two rollers 78A disposed at each of a front end and a rear end thereof. Each roller 78A is configured to contact the document table 17 from beneath.

The holder 71 is a resin member formed substantially in an upward-open box shape. The holder 71 extends in the front-to-rear direction, and contains the image sensor 79 therein. Although it is not shown in any drawing, the holder 71 is configured to engage with a front end and a rear end of the sensor case 78 and hold the image sensor 79 while tolerating displacement of the image sensor 79 in the vertical direction.

As shown in FIGS. 8, 10, and 12, the third convex portion 130 is disposed at one location of a front end 71A of the holder 71. The third convex portion 130 is formed integrally with the holder 71. The third convex portion 130 protrudes, in a rectangular column shape, down toward the bottom wall 13 from the document table 17 in the vertical direction. The third convex portion 130 has a distal end surface 131 that is a flat surface perpendicular to the vertical direction.

The distal end surface 111 of the first convex portion 110 contacts the distal end surface 131 of the third convex portion 130. When the movement of the timing belt 7C is transmitted to the holder 71, and the reading unit 9 reciprocates along the left-to-right direction, the third convex portion 130 slides, at one location, relative to and in contact with the first convex portion 110.

As shown in FIGS. 9, 11, and 12, the fourth concave portions 140 are provided at a rear end 71B of the holder 71. Further, as shown in FIG. 11, the fourth concave portions 140 are disposed at two locations such as to position the image sensor 79 at the middle between the two locations in the left-to-right direction. The fourth concave portions 140 are formed integrally with the holder 71. As shown in FIGS. 9 and 12, each fourth concave portion 140 is recessed up toward the document table 17 from the bottom wall 13 in the vertical direction.

Each fourth concave portion 140 has two slanted surfaces 141A and 141B. The two slanted surfaces 141A and 141B are slanted so as to be closer to each other from the bottom wall 13 toward the document table 17 in the vertical direction in a cross-sectional view taken along a plane perpendicular to the left-to-right direction.

The arc section 121 of the second convex portion 120 contacts the two slanted surfaces 141A and 141B of each fourth concave portion 140. When the movement of the timing belt 7C is transmitted to the holder 71, and the reading unit 9 reciprocates along the left-to-right direction, the fourth concave portions 140 slide relative to and in contact with the second convex portion 120, at the two locations such as to position the image sensor 79 at the middle between the two locations in the left-to-right direction.

As shown in FIGS. 10 and 11, the first urging member 77A and the second urging member 77B are compression coil springs. The first urging member 77A is disposed at the front end 71A of the holder 71. The second urging member 77B is disposed at the rear end 71B of the holder 71.

As shown in FIG. 10, the first urging member 77A is located closer to the document table 17 than the third convex portion 130 in the vertical direction. A lower end of the first urging member 77A contacts a bottom of the holder 71 from above. An upper end of the first urging member 77A contacts a bottom of the sensor case 78 from beneath.

As shown in FIG. 11, the second urging member 77B is located closer to the document table 17 than the fourth concave portions 140 in the vertical direction. A lower end of the second urging member 77B contacts the bottom of the holder 71 from above. An upper end of the second urging member 77B contacts the bottom of the sensor case 78 from beneath.

Thus, the first urging member 77A and the second urging member 77B are configured to apply urging forces to urge the image sensor 79 toward document table 17. When the image sensor 79 is moved upward by the urging forces, each roller 78A contacts the document table 17 from beneath. Consequently, maintained is a constant distance in the vertical direction between the sensor device 79A and the document table 17.

In the image reader 1 configured as above, when the scanning mechanism 7 operates and causes the reading unit 9 to move along the left-to-right direction, the first convex portion 110 and the third convex portion 130 come into sliding contact with each other, and the second convex portion 120 and the fourth concave portions 140 come into sliding contact with each other.

In this case, as shown in FIG. 12, the holder 71 is positioned in the vertical direction as the distal end surface 111 of the first convex portion 110 contacts the distal end surface 131 of the third convex portion 130 on the front end of the holder 71, and the arc section 121 of the second convex portion 120 contacts the slanted surfaces 141A and 141B of each fourth concave portion 140 on the rear end of the holder 71.

Further, the holder 71 is positioned in the front-to-rear direction and positioned around a rotational axis X71 extending in the vertical direction as the arc section 121 of the second convex portion 120 contacts the slanted surfaces 141A and 141B of each fourth concave portion 140.

In other words, in the image reader 1, as, when the reading unit 9 moves, the third convex portion 130 is guided by the first convex portion 110, and the fourth concave portions 140 are guided by the second convex portion 120, the reading unit 9 is allowed to move along the left-to-right direction while being positioned relative to the housing 5.

<Operations and Advantageous Effects>

In the image reader 1 of the embodiment, the resin base 10 includes the first convex portion 110 disposed at the front end 13A of the bottom wall 13, and the second convex portion 120 disposed at the rear end 13B of the bottom wall 13. Further, the first convex portion 110 and the third convex portion 130 of the holder 71 come into sliding contact with each other. Moreover, the second convex portion 120 and the fourth concave portions 140 of the holder 71 come into sliding contact with each other. Thus, according to the image reader 1, it is possible to achieve a low cost for manufacturing the image reader 1 by employing the first convex portion 110 made of resin and the second convex portion 120 made of resin instead of known metal guiderails.

Further, in the image reader 1, as shown in FIGS. 10 and 11, a reaction force R1A generated when the first urging member 77A urges the image sensor 79 toward the document table 17 is applied to the first convex portion 110 and the front end 13A of the bottom wall 13 via the holder 71 (at which the first urging member 77A and the second urging member 77B are provided) and the third convex portion 130 of the holder 71. Further, a reaction force R1B generated when the second urging member 77B urges the image sensor 79 toward the document table 17 is applied to the second convex portion 120 and the rear end 13B of the bottom wall 13 via the holder 71 (at which the first urging member 77A and the second urging member 77B are provided) and the fourth concave portions 140 of the holder 71.

The first side wall 11 extends upward from the front end 13A of the bottom wall 13. The second side wall 12 extends upward from the rear end 13B of the bottom wall 13. The first side wall 11 has such a high stiffness as to support the front end 17A of the document table 17. Further, the second side wall 12 has such a high stiffness as to support the rear end 17B of the document table 17. Therefore, the first convex portion 110 and the front end 13A of the bottom wall 13 are reinforced by the first side wall 11 having the high stiffness, so as to bear the reaction force R1A in a favorable manner. Further, the second convex portion 120 and the rear end 13B of the bottom wall 13 are reinforced by the second side wall 12 having the high stiffness, so as to bear the reaction force R1B in a favorable manner. Hence, even though the reaction forces R1A and R1B are applied to the bottom wall 13 for a long time period, the bottom wall 13 is not likely to be creep-deformed such that the center thereof in the front-to-rear direction is rendered farther from the document table 17 in the vertical direction. Thus, the holder 71, of which the third convex portion 130 and the fourth concave portions 140 come into sliding contact with the first convex portion 110 and the second convex portion 120, respectively, is not likely to be rendered farther from the document table 17 toward the bottom wall 13 in the vertical direction. Thereby, it is possible to maintain, for a long time period, a situation where the first urging member 77A and the second urging member 77B urge the image sensor 79 toward the document table 17 in a favorable manner. Consequently, according to the image reader 1, it is possible to maintain, for a long time period, a high accuracy for positioning the image sensor 79 relative to the document table 17 in the vertical direction.

Thus, according to the image reader 1 of the embodiment, it is possible to achieve a low cost for manufacturing the image reader 1 and reduce deterioration of the quality in image reading by the image reader 1.

Further, in the image reader 1, as shown in FIG. 12, the holder 71 is positioned in the vertical direction as the distal end surface 111 of the first convex portion 110 contacts the distal end surface 131 of the third convex portion 130 on the front end of the holder 71, and the arc section 121 of the second convex portion 120 contacts the slanted surfaces 141A and 141B of each fourth concave portion 140 on the rear end of the holder 71. Therefore, the accuracy for positioning the holder 71 in the vertical direction is less likely to be lowered. Further, the holder 71 is positioned in the front-to-rear direction and positioned around the rotational axis X71 extending in the vertical direction as the arc section 121 of the second convex portion 120 contacts the slanted surfaces 141A and 141B of each fourth concave portion 140. Therefore, it is possible to omit a configuration for positioning the holder 71 in the front-to-rear direction and around the rotational axis X71 with the first convex portion 110 and the third convex portion 130. Further, since the first convex portion 110, the second convex portion 120, the third convex portion 130, and the fourth concave portions 140 are formed as above, it is possible to achieve low contact-sliding resistances between the first convex portion 110 and the third convex portion 130 and between the second convex portion 120 and the fourth concave portions 140. Thus, it is possible to smoothly move the holder 71 along the left-to-right direction.

Further, according to the image reader 1, the third convex portion 130 slides, at one location, in contact with the first convex portion 110. In addition, the fourth concave portions 140 slide in contact with the second convex portion 120, at two locations such as to position the image sensor 79 at the middle between the two locations in the left-to-right direction. Thereby, the holder 71 is supported by the three points, and therefore, the first convex portion 110, the second convex portion 120, the third convex portion 130, and the fourth concave portions 140 are allowed to certainly come into sliding contact with their respective corresponding portions. Consequently, in the image reader 1, it is possible to achieve a high accuracy for positioning the holder 71.

Further, in the image reader 1, the housing 5 is supported by the case 3 so as to be swingable around the axis X5 at the rear end 10B of the base 10. Therefore, the first side wall 11, the first convex portion 110, and the third convex portion 130 are far from the axis X5. Meanwhile, the second side wall 12, the second convex portion 120, and the fourth concave portions 140 are close to the axis X5. Additionally, in the image reader 1, it is assumed that, in most cases, the user holds the front end of the base 10 that is close to the first side wall 11 and far from the axis X5. Therefore, it is preferable to thin a portion of the base 10 on the side close to the first side wall 11. In this respect, near the first side wall 11, disposed are the first convex portion 110 and the third convex portion 130 that contribute to positioning the holder 71 only in the vertical direction. Therefore, the first convex portion 110 and the third convex portion 130 are less likely to be voluminous than the second convex portion 120 and the fourth concave portions 140 that contribute to three kinds of positioning of the holder 71 (i.e., positioning the holder 71 in the vertical direction, positioning the holder 71 in the front-to-rear direction, and positioning the holder 71 around the rotational axis X71 extending in the vertical direction). Hence, it is possible to easily thin a portion of the base 10 on the side close to the first side wall 11, as shown in FIG. 5. Further, a portion of the base 10 on the side close to the second side wall 12 and the axis X5 is formed thick in the vertical direction, so as to allow hinges (not shown) for swingably supporting the housing 5 to be attached thereto and secure a large space inside the base 10. Therefore, the second convex portion 120 and the fourth concave portions 140 disposed near the second side wall 12 are allowed to attain the three kinds of positioning of the holder 71 by effectively utilizing the large space. Further, the portion of the base 10 on the side close to the second side wall 12 and the axis X5 is configured to have a high stiffness so as to allow hinges to be attached thereto. Thus, the second convex portion 120 and the fourth concave portions 140 are certainly reinforced by the second side wall 12, and thereby, it is possible to position the holder 71 with a further higher accuracy.

Further, in the image reader 1, the first urging member 77A and the second urging member 77B are configured to urge the image sensor 79 toward the document table 17 near the front end 71A and the rear end 71B of the holder 71, respectively. Hence, according to the image reader 1, it is possible to urge the image sensor 79 toward the document table 17 in a more stable manner (a less rickety manner) than, e.g., when a single urging member is provided at a center in the front-to-rear direction.

Further, in the image reader 1, the document table 17 is a glass plate having a high stiffness. In addition, such a configuration that the document table 17 is pinched between the base 10 and the top cover 19 heightens an overall stiffness of the housing 5. Thus, according to the image reader 1, since the stiffness properties of the first side wall 11 and the second side wall 12 are further heightened, the first convex portion 110 and the front end 13A of the bottom wall 13 are effectively reinforced by the first side wall 11, and the second convex portion 120 and the rear end 13B of the bottom wall 13 are effectively reinforced by the second side wall 12.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations of the same configurations as exemplified in the aforementioned embodiments will be omitted.

[Modifications]

For example, the respective shapes of the first convex portion 110, the second convex portion 120, the third convex portion 130, and the fourth concave portions 140 are not limited to the shapes exemplified in the aforementioned embodiment. The first convex portion 110, the second convex portion 120, the third convex portion 130, and the fourth concave portions 140 may be formed in any shapes as far as the first convex portion 110 and the third convex portion 130 are allowed to come into sliding contact with each other, and the second convex portion 120 and the fourth concave portions 140 are allowed to come into sliding contact with each other. For instance, the concave shape may include various shapes such as shapes of a hole having a bottom, a through hole, a groove, and a notch. Further, the cross-sectional shape of the second convex portion 120 exemplified in the aforementioned embodiment may be replaced with the cross-sectional shape of the fourth concave portions 140 exemplified in the aforementioned embodiment. Likewise, the cross-sectional shape of the fourth concave portions 140 exemplified in the aforementioned embodiment may be replaced with the cross-sectional shape of the second convex portion 120 exemplified in the aforementioned embodiment.

The first convex portion 110 of the aforementioned embodiment may be replaced with a portion configured to be recessed down toward the bottom wall 13 from the document table 17, instead of protruding up toward the document table 17 from the bottom wall 13. The second convex portion 120 of the aforementioned embodiment may be replaced with a portion configured to be recessed down toward the bottom wall 13 from the document table 17, instead of protruding up toward the document table 17 from the bottom wall 13. The third convex portion 130 of the aforementioned embodiment may be replaced with a portion configured to be recessed up toward the document table 17 from the bottom wall 13, instead of protruding down toward the bottom wall 13 from the document table 17. The fourth concave portions 140 of the aforementioned embodiment may be replaced with portions configured to protrude down toward the bottom wall 13 from the document table 17, instead of being recessed up toward the document table 17 from the bottom wall 13.

Further, for instance, another combination of guide portions may be added between the combination of the first convex portion 110 and the third convex portion 130 and the combination of the second convex portion 120 and the fourth concave portions 140 in the front-to-rear direction. The first side wall 11 and the second side wall 12 may be configured to indirectly support the document table 17. The first convex portion 110 and the second convex portion 120 may be formed integrally with the base 10, or may be separate from the base 10 and attached to the base 10.

What is claimed is:

1. An image reader comprising:
a housing comprising:
a document table; and
a base configured to support the document table from beneath; and
a reading unit comprising:
an image sensor extending in a first direction and configured to read an image of a document sheet on the document table;
a holder configured to hold the image sensor; and an urging unit disposed at the holder and configured to urge the image sensor toward the document table, the reading unit configured to move along a second direction perpendicular to the first direction, wherein the base comprises:
- a bottom wall disposed below the document table;
- a first guide disposed at a first-side portion of the bottom wall in the first direction, the first guide extending in the second direction and formed in one shape of a shape protruding from the bottom wall toward the document table and a shape recessed from the document table toward the bottom wall in a third direction perpendicular to the first direction and the second direction; and
- a second guide disposed at a second-side portion of the bottom wall in the first direction, the second guide extending in the second direction and formed in one shape of a shape protruding from the bottom wall toward the document table and a shape recessed from the document table toward the bottom wall in the third direction, and wherein the reading unit further comprises:
- a third guide disposed at a first-side portion of the holder in the first direction, the third guide formed in one shape of a shape protruding from the document table toward the bottom wall and a shape recessed from the bottom wall toward the document table in the third direction, the third guide configured to come into sliding contact with the first guide when the reading unit moves; and
- a fourth guide disposed at a second-side portion of the holder in the first direction, the fourth guide formed in one shape of a shape protruding from the document table toward the bottom wall and a shape recessed from the bottom wall toward the document table in the third direction, the fourth guide configured to come into sliding contact with the second guide when the reading unit moves.

2. The image reader according to claim 1,
wherein the first guide comprises a first convex portion having a distal end surface perpendicular to the third direction,
wherein the third guide comprises a third convex portion having a distal end surface perpendicular to the third direction, the distal end surface of the third convex portion being configured to contact the distal end surface of the first convex portion,
wherein the second guide comprises a second convex portion having an arc section that bulges in an arc shape from bottom wall toward the document table in the third direction in a cross-sectional view of the second convex portion taken along a plane perpendicular to the second direction, and
wherein the fourth guide comprises a concave portion having two slanted surfaces that are slanted so as to be closer to each other from the bottom wall toward the document table in the third direction in a cross-sectional view of the concave portion taken along a plane perpendicular to the second direction, the slanted surfaces of the concave portion being configured to contact the arc section of the second convex portion.

3. The image reader according to claim 1,
wherein the third guide is configured to slide, at one location, in contact with the first guide, and
wherein the fourth guide is configured to slide in contact with the second guide, at two locations such as to position the image sensor at a middle between the two locations in the second direction.

4. The image reader according to claim 2,
wherein the third guide is configured to slide, at one location, in contact with the first guide, and
wherein the fourth guide is configured to slide in contact with the second guide, at two locations such as to position the image sensor at a middle between the two locations in the second direction.

5. The image reader according to claim 2, further comprising a case disposed below the housing, the housing being supported by the case so as to be swingable around an axis extending in the second direction at a second-side portion of the base in the first direction.

6. The image reader according to claim 1,
wherein the urging unit comprises:
- a first urging member disposed closer to the document table than the third guide in the third direction; and
- a second urging member disposed closer to the document table than the fourth guide in the third direction.

7. The image reader according to claim 1,
wherein the housing further comprises a frame-shaped cover configured to contact a fringe of the document table from above, and pinch the document table with base.

8. An image reader comprising:
a housing comprising:
- a document table; and
- a base configured to support the document table from beneath; and a reading unit comprising:
- an image sensor extending in a first direction and configured to read an image of a document sheet on the document table;
- a holder configured to hold the image sensor; and
- an urging unit disposed at the holder and configured to urge the image sensor toward the document table, the reading unit configured to move along a second direction perpendicular to the first direction, wherein the base comprises:
- a bottom wall disposed below the document table;
- a first guide disposed at a first-side portion of the bottom wall in the first direction, the first guide extending in the second direction; and
- a second guide disposed at a second-side portion of the bottom wall in the first direction, the second guide extending in the second direction, wherein the reading unit comprises:
- a third guide disposed at a first-side portion of the holder in the first direction; and
- a fourth guide disposed at a second-side portion of the holder in the first direction, and wherein the reading unit is further configured to move along the second direction while being positioned relative to the housing with the third guide being guided by the first guide and the fourth guide being guided by the second guide in response to movement of the reading unit along the second direction.

9. An image reader comprising:
a housing comprising:
- a document table; and
- a base comprising:
  - a bottom wall disposed below the document table; and
  - a side wall extending upward from the bottom wall and configured to support a fringe of the document table from beneath; and a reading unit comprising:

an image sensor extending in a first direction and configured to read an image of a document sheet on the document table; and a holder configured to hold the image sensor, the reading unit configured to move along a second direction perpendicular to the first direction, wherein the base further comprises:

a first guide disposed adjacent to the side wall at a first-side portion of the bottom wall in the first direction, the first guide extending in the second direction; and a second guide disposed adjacent to the side wall at a second-side portion of the bottom wall in the first direction, the second guide extending in the second direction, and wherein the reading unit further comprises:

a third guide disposed at a first-side portion of the holder in the first direction, the third guide configured to be guided by the first guide of the base while sliding in contact with the first guide during movement of the reading unit along the second direction; and a fourth guide disposed at a second-side portion of the holder in the first direction, the fourth guide configured to be guided by the second guide of the base while sliding in contact with the second guide during the movement of the reading unit along the second direction.

* * * * *